US009144822B2

(12) United States Patent
Zhao et al.

(10) Patent No.: US 9,144,822 B2
(45) Date of Patent: Sep. 29, 2015

(54) METHODS AND SYSTEMS FOR JOINING MATERIALS

(71) Applicant: General Electric Company, Schenectady, NY (US)

(72) Inventors: Qi Zhao, Niskayuna, NY (US); Robert John Zabala, Niskayuna, NY (US); Laurent Cretegny, Niskayuna, NY (US); Jeffrey Jon Schoonover, Niskayuna, NY (US); Mark Kevin Meyer, Cincinnati, OH (US); Keith Anthony Lauria, Niskayuna, NY (US); William R Catlin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 77 days.

(21) Appl. No.: 13/631,162

(22) Filed: Sep. 28, 2012

(65) Prior Publication Data

US 2014/0093657 A1 Apr. 3, 2014

(51) Int. Cl.
*B05B 7/16* (2006.01)
*B05C 11/10* (2006.01)
*B05D 1/26* (2006.01)
*B22D 19/10* (2006.01)
*B23K 3/06* (2006.01)
*B05C 5/00* (2006.01)

(52) U.S. Cl.
CPC *B05D 1/26* (2013.01); *B22D 19/10* (2013.01); *B23K 3/0638* (2013.01); *B05C 5/001* (2013.01)

(58) Field of Classification Search
CPC .............. B23K 5/00; B26P 6/007; B05B 7/06

USPC .......... 427/140, 591, 422, 294; 118/302, 692; 219/121.39, 121.48; 414/208; 75/331, 75/340; 239/601, 602

See application file for complete search history.

(56) References Cited

U.S. PATENT DOCUMENTS 3,653,426 A   4/1972  Groteke et al.
4,114,675 A   9/1978  Buhrer
(Continued)

FOREIGN PATENT DOCUMENTS

EP   1439041 A2   7/2004
EP   2656962 A2   10/2013
(Continued)

OTHER PUBLICATIONS

PCT Search Report and Written Opinion dated Feb. 17, 2014, issued in connection with corresponding PCT Application No. PCT/US2013/062105.

*Primary Examiner* — Yewebdar Tadesse
(74) *Attorney, Agent, or Firm* — John P. Darling

(57) ABSTRACT

A method is provided for joining a filler material to a substrate material. The method includes melting the filler material within a melting chamber of a crucible such that the filler material is molten. The crucible has an outlet fluidly connected to the melting chamber. The method also includes holding the filler material within the melting chamber of the crucible by applying a first pressure differential across the outlet of the crucible, and releasing the filler material from the melting chamber of the crucible by applying a second pressure differential across the outlet of the crucible to deliver the filler material to a target site of the substrate material. The second pressure differential has a different value than the first pressure differential.

22 Claims, 4 Drawing Sheets

(56) References Cited

U.S. PATENT DOCUMENTS

| | | |
|---|---|---|
| 4,153,100 A | 5/1979 | Balevski et al. |
| 4,804,036 A | 2/1989 | Motomura |
| 5,190,674 A | 3/1993 | Monks |
| 5,286,008 A | 2/1994 | de Haas et al. |
| 5,297,611 A | 3/1994 | Legge et al. |
| 5,416,793 A * | 5/1995 | Hugo et al. .................. 373/142 |
| 5,544,195 A | 8/1996 | Hardt et al. |
| 5,550,344 A * | 8/1996 | Winterfeldt .............. 219/121.39 |
| 5,642,768 A * | 7/1997 | Shiels et al. ................. 164/335 |
| 6,525,291 B1 * | 2/2003 | Sanders et al. ........... 219/121.39 |
| 6,892,791 B1 | 5/2005 | Minor et al. |
| 7,628,952 B2 | 12/2009 | Klimas |
| 8,151,865 B1 | 4/2012 | Cretegny et al. |
| 2004/0007790 A1 * | 1/2004 | Kato et al. ...................... 264/13 |

FOREIGN PATENT DOCUMENTS

| | | |
|---|---|---|
| JP | H11342463 A | 12/1999 |
| JP | 2006326645 A | 12/2006 |
| WO | 2013038952 A1 | 3/2013 |

* cited by examiner

METHODS AND SYSTEMS FOR JOINING MATERIALS

BACKGROUND

Application fatigue may cause various metal, ceramic, and alloy components (e.g., super alloys) to experience wear. For example, cracking, abrasion, erosion, and/or a variety of other conditions may cause the removal or wear of original substrate material. To repair the worn components, filler material may be added (e.g., welded) to fill in cracks, to patch abrasions, and/or to otherwise replace material lost to erosion. Likewise, when joining two or more components together, filler material may be added to the original substrate material of one or more of the components. Filler material that is the same as, or similar to, the substrate material may be used to provide relatively strong uniform mechanical properties across the repaired and/or joined components.

When the filler material is a relatively high temperature performance alloy (e.g., nickel and/or cobalt based super alloys used in relatively hot gas paths of gas turbine engines) that has a relatively high melting temperature, a relatively significant application of energy must be applied to the filler material before the filler material can be applied to the original substrate material. But, the large amount of radiant heat (e.g., produced by a welding apparatus) that is used to melt the filler material may also affect the original substrate material. For example, the impingement of the radiant heat may cause slumping, melting, recrystallization, grain growth, and/or other changes to the microstructure of the original substrate material. Such changes in the original substrate material may reduce the strength, toughness, and/or other mechanical properties of the component(s) being repaired and/or joined together. Moreover, the impingement of the radiant heat on the original substrate material may cause the joint between the filler material and the original substrate material to fracture during cooling, which is commonly referred to as "hot tearing".

While filler materials with lower melting temperatures may alternatively be used, such filler materials may provide lower performance at high temperatures and/or possess mechanical properties that are increasingly different than the mechanical properties of the original substrate material. For example, a brazing process may impart less heat to the original substrate material. But, the melting point of brazing materials must be lower than the melting point of the original substrate material, which may require the use of melting point suppressing elements (e.g., silicon and/or boron) in quantities that result in the formation of relatively high amounts of brittle intermetallic phases that deleteriously affect the mechanical properties of the repaired and/or joined component(s). What is needed is a technique and system that allow the use of relatively high melting temperature filler material without causing problems with the original substrate material.

BRIEF DESCRIPTION

In one embodiment, a method is provided for joining a filler material to a substrate material. The method includes melting the filler material within a melting chamber of a crucible such that the filler material is molten. The crucible has an outlet fluidly connected to the melting chamber. The method also includes holding the filler material within the melting chamber of the crucible by applying a first pressure differential across the outlet of the crucible, and releasing the filler material from the melting chamber of the crucible by applying a second pressure differential across the outlet of the crucible to deliver the filler material to a target site of the substrate material. The second pressure differential has a different value than the first pressure differential.

In another embodiment, a system is provided for joining a filler material to a substrate material. The system includes a crucible having a melting chamber for holding the filler material. The crucible includes an outlet fluidly connected to the melting chamber. A heating element is operatively connected to the crucible for heating the filler material within the melting chamber of the crucible. The heating element is configured to melt the filler material within the melting chamber such that the filler material is molten. A flow control mechanism is operatively connected to the crucible for controlling flow of the filler material through the outlet of the melting chamber. The flow control mechanism is configured to apply a pressure differential across the outlet of the crucible. The pressure differential holds the filler material within the melting chamber.

In another embodiment, a method is provided for joining a filler material to a substrate material. The method includes melting the filler material within a melting chamber of a crucible such that the filler material is molten, wherein the crucible has an outlet fluidly connected to the melting chamber. The method also includes holding the filler material within the melting chamber of the crucible by providing a negative gage pressure within the melting chamber of the crucible that is equal to or less than a head pressure of the filler material at the outlet of the crucible. The method further includes releasing the filler material from the melting chamber of the crucible by providing a positive gage pressure within the melting chamber of the crucible that is equal to or greater than approximately 5 pounds per square inch (psi) to deliver the filler material to a target site of the substrate material.

DETAILED DESCRIPTION

Figure 1:
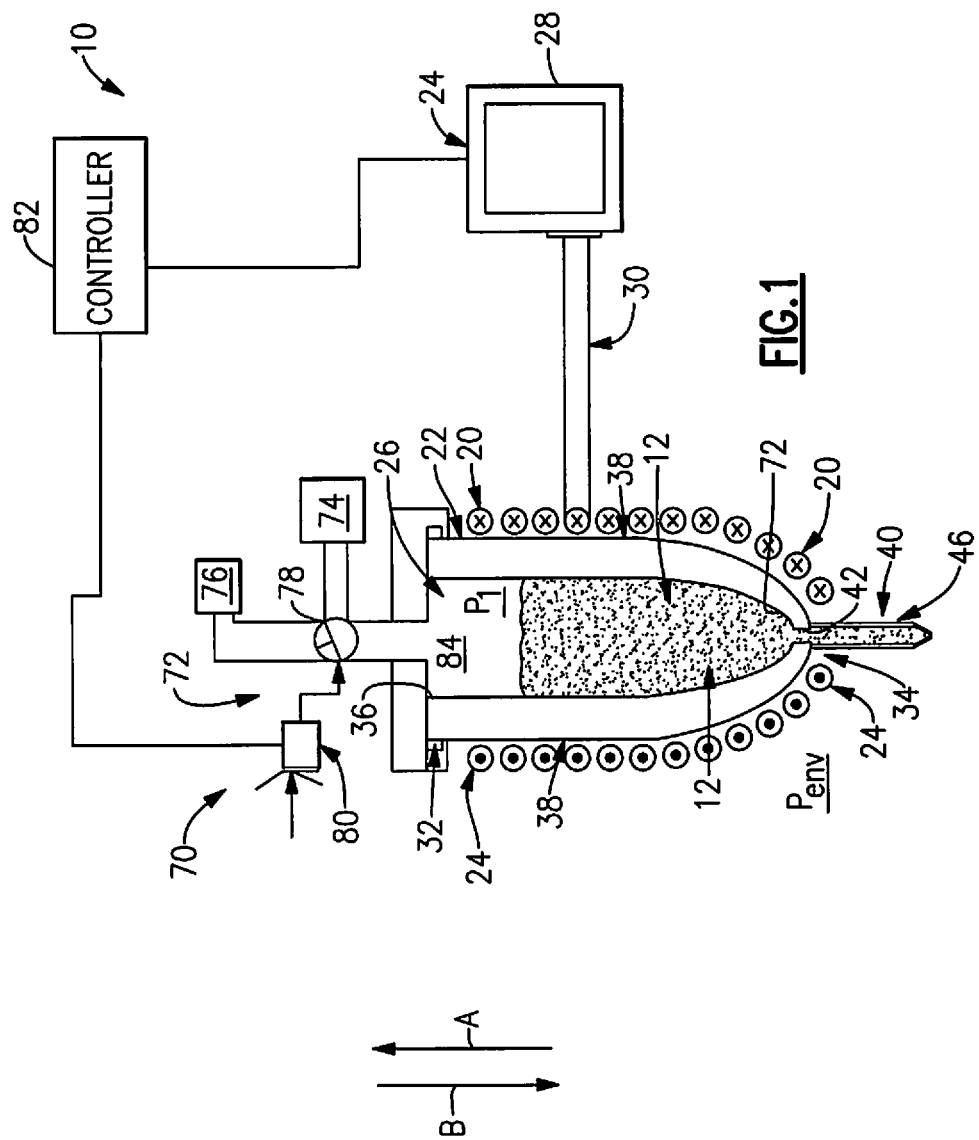
FIG. 1 is a schematic illustration of an exemplary embodiment of a system for joining a filler material to a substrate material.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide methods and systems for joining a filler material to a substrate material. Various embodiments may include melting the filler material within a melting chamber of a crucible such that the filler material is molten, holding the filler material within the melting chamber of the crucible by applying a first pressure differential across an outlet of the crucible, and releasing the filler material from the melting chamber of the crucible by applying a second pressure differential across the outlet of the crucible to deliver the filler material to a target site of the substrate material. The filler material may be melted at a remote distance away from the target site of the substrate material such that the melting of the filler material does not cause the target site of the substrate material to rise above a solidus and/or recrystallization temperature of the target site. The molten filler material may be delivered to the target site of the substrate material in a continuous stream. Various embodiments may provide a flow control mechanism that uses varied pressure differentials to control consecutive ejections of a filler material through a nozzle for inert gas and/or joining operations.

Various embodiments may provide an improvement in the mechanical properties of conventional joining and repair techniques. Various embodiments may provide relatively practical and relatively effective approaches to delivering filler material consecutively with a reduced amount, or without, melt contaminations. Technical effects of various embodiments may include reducing or eliminating the use of melting point suppressants in the filler material, reducing the amount of excessive heat imparted on the substrate material, and/or delivering molten filler material for component repairs without filler material contaminations. For example, technical effects of various embodiments may provide relatively clean molten filler material delivery for consecutive component repairs without filler material contaminations and/or for recast repairs without filler material contaminations. Further, technical effects of various embodiments may include melting a filler material (e.g., a super alloy filler material) inside a melting chamber (e.g., of a ceramic crucible) without thermal shock, mechanical failures, and/or melt contaminations (e.g., from the melting chamber). Technical effects of various embodiments may include enabling the repair of components that were previously replaced because no repair techniques were available to restore adequate structure and/or properties of the components. Moreover, technical effects of various embodiments may include enabling alternate manufacturing options for casting relatively high quality sub-components that can then be joined with joints having mechanical properties approaching, similar to, and/or identical to the substrate material.

As used herein, the term "component" may be any type of component having any structure, any size, and any geometry that allows for the application of molten filler material to a target site of a substrate material of the component. For example, the component may include a relatively flat repair surface with a void at the target site. The void may be present from various application fatigues, such as, but not limited to, cracking, rubbing, abrasion, erosion, other conditions that may cause the removal and/or wear of the substrate material of the component, and/or the like. Moreover, in some embodiments, the component includes one or more curves, corners, arms, joints, and/or the like. Examples of components that may be repaired and/or joined using the various embodiments described and/or illustrated herein include, but are not limited to, components fabricated using a casting process, aircraft components, aircraft engine components, gas turbine engine components (e.g., a bucket for a gas turbine engine), airfoils (e.g., a turbine blade for a gas turbine engine), nozzles (e.g., a single crystal nozzle of a gas turbine engine), and/or the like.

The substrate material of the component may include any substance(s) such that the substrate material is capable of having a molten filler material joined (e.g., contacted and subsequently bonded) thereto at one or more locations (i.e., target sites). For example, the substrate material may include, but is not limited to, metals, alloys, ceramics, super alloys, and/or the like. In some embodiments, the substrate material includes a relatively low amount, or no, silicon. In some embodiments, the substrate material includes a nickel-based super alloy, such as, but not limited to, nickel-based super alloys used in gas turbine engines for relatively hot gas path applications, and/or the like. For example, the substrate material may include the commercially available René™ N5 alloy. Moreover, in some embodiments, the substrate material includes a cobalt-based super alloy such as, but not limited to, cobalt-based super alloys used in gas turbine engines for relatively hot gas path applications, and/or the like. The target site of the substrate material of the component may be any location(s) where filler material is intended to be added. For example, the target site may include a crack, a joint between multiple components or sub-components, an abrasion, an eroded area, and/or the like.

FIG. 1 is a schematic illustration of an exemplary embodiment of a system 10 for joining a filler material 12 to a substrate material 14 (shown in FIG. 3) of a component 16 (shown in FIG. 3) at a target site 18 (shown in FIG. 3) of the substrate material 14. As will be described below, the system 10 may be disposed at a remote distance $D_R$ (shown in FIG. 3) away from the target site 18 of the substrate material 14. As used herein, the term "remote distance" includes any distance between the target site 18 and the system 10 (e.g., a heating element 20, a crucible 22, and any molten filler material 12 in the crucible 22) that is large enough such that the target site 18 does not rise above the solidus and/or recrystallization temperature of the target site 18 as a result of the radiant energy from the system 10.

The system 10 includes the crucible 22, a heating unit 24, and a flow control mechanism 70. The heating unit 24 includes the heating element 20. The crucible 22 is configured to hold the filler material 12. Specifically, the crucible 22 includes a melting chamber 26. The melting chamber 26 is configured to hold the filler material 12 therein as the filler material 12 is melted and thereby transformed into a molten state. The melting chamber 26 is configured to at least temporarily hold the molten filler material 12 therein before the molten filler material 12 is delivered to the substrate material 14.

The crucible 22 may include any substance(s) that enables the melting chamber 26 to hold the filler material 12 therein as the filler material 12 is melted and that enables the melting chamber to at least temporarily hold the molten filler material 12 therein. Examples of suitable substances of the crucible 22 include, but are not limited to, oxides, carbides, nitrides, alumina-based ceramics, alumina, porous alumina, boron nitride, quartz, ceramics, refractory ceramics, metallic cold hearths, substances that are susceptible to induction heating, and/or the like. Although shown as having the shape of a conical cylinder, in addition or alternative, the crucible 22 may include any other shape that enables the crucible 22 to function as described and/or illustrated herein. In some embodiments, the crucible 22 is configured to be thermal shock resistant to relatively rapid heating and is sufficiently strong and inert to contain molten filler material 12 (e.g., GTD444 alloy, René™ 142 alloy, and N5 alloy) at at least approximately 1550° C. for at least approximately 30 minutes. The melting chamber 26 of the crucible 22 may have any capacity, such as, but not limited to, greater than approximately 10 grams, greater than approximately 30 grams, and/or the like.

The filler material 12 may include any substance(s) such that the filler material 12 is capable of being transformed into a completely molten state (i.e., heated to a state above the liquidus temperature of the filler material 12), delivered to the substrate material 14 in the molten state, and joined with the substrate material 14. In some embodiments, the filler material 12 is superheated by 200° C. or greater. The filler material 12 may be capable of being delivered to the target site 18 of the substrate material in a continuous molten stream. Examples of substances that may be included within the filler material 12 include, but are not limited to, metals, alloys, ceramics, super alloys, and/or the like. In some embodiments, the filler material 12 includes a relatively low amount, or no, silicon. In some embodiments, the filler material 12 includes a nickel-based super alloy, such as, but not limited to, nickel-based super alloys used in gas turbine engines for relatively hot gas path applications, and/or the like. For example, the filler material 12 may include the commercially available Renè™ N5 alloy or the commercially available Renè™ 142 alloy. Moreover, in some embodiments, the filler material 12 includes a cobalt-bases super alloy such as, but not limited to, cobalt-based super alloys used in gas turbine engines for relatively hot gas path applications, and/or the like.

In some embodiments, the composition of the filler material 12 is identical to the composition of the substrate material 14 or is similar to the composition of the substrate material 14. Such embodiments wherein the composition of the filler material 12 is identical or similar to the composition of the substrate material 14 may reduce or prevent shrinkage, cracking, and/or other performance defects because the filler material 12 and the substrate material 14 possess the same or similar physical characteristics. Furthermore, such embodiments may provide a closer match of physical properties between the substrate material 14 and the filler material 12 to potentially allow for increased and/or more predictable performance. In some embodiments, such as wherein the substrate material 14 comprises a single crystal, the filler material 12 may be similar but not the same in composition as the substrate material 14 because of grain boundaries at the target site 18. For example, when the substrate material 14 includes a single crystal Renè™ N5, the filler material 12 may include Renè™ 142.

The filler material 12 may be supplied to the melting chamber 26 of the crucible 22 in any state, structure, form, configuration, size, shape, quantity, and/or the like, such as, but not limited to, as one or more ingots, as one or more pellets, as one or more rods, as one or more blocks, as one or more wires, as a powder, as a slurry, and/or the like.

As described above, the system 10 includes the heating unit 24, which includes the heating element 20 for transforming the filler material 12 into a molten state. Specifically, the heating element 20 is operatively connected to the crucible 22 such that the heating element 20 is configured to heat the filler material 12 within the melting chamber 26 of the crucible 22 to thereby transform the filler material 12 into a molten state. In other words, the heating element 20 is configured to melt the filler material 12 within the melting chamber 26 such that the filler material 12 is molten. The heating element 20 may be configured to maintain the filler material 12 within the melting chamber 26 as molten and/or within a predetermined temperature range, for example for a predetermined amount of time before the molten filler material 12 is applied to the substrate material 14.

The heating element 20 may be any type of heating element that is capable of applying enough energy (e.g., heat) to the filler material 12 within the melting chamber 26 of the crucible 22 such that the filler material 12 becomes molten. In the exemplary embodiment of the system 10, the heating element 20 is an induction coil. The heating unit 24 includes a power supply 28 that is operatively connected to the induction coil of the heating element 20 through an electrical connection 30. The power supply 28 supplies an electrical current (e.g., an alternating electrical current) to the induction coil of the heating element 20. The electrical current energizes the induction coil of the heating element 20 such that the induction coil generates an electromagnetic field that heats the filler material 12 within the melting chamber 26 via resistive heating.

The power source 28 may energize the induction coil of the heating element 20 with any energization scheme (e.g., any amount of voltage and/or any amount of current) that heats filler material 12 within the melting chamber 26 of the crucible 22 such that the filler material 12 becomes molten. The induction coil of the heating element 20 may have any configuration, any arrangement, any structure, any shape, any size, any number of turns, any sized turns, any number of different turn directions, any overall length, any number of differently configured segments, and/or the like that enable the induction coil 20a to heat filler material 12 within the melting chamber 26 such that the filler material 12 is transformed into a molten state. In the exemplary embodiment of the system 10, the induction coil of the heating element is wound around the circumference of the crucible 22. But, the induction coil of the heating element 20 may have any other operable configuration near and/or around the melting chamber 26 of the crucible 22. Although shown and described as being an induction coil, the heating element 20 may additionally or alternatively include any other type of heating element, such as, but not limited to, an arc welding apparatus (e.g., TIG welding), a gas welding apparatus (e.g., oxyacetylene welding), an energy beam welding apparatus (e.g., laser beam welding), a microwave, and/or the like.

The crucible 22 extends from a top 32 to a bottom 34. In the exemplary embodiment of the system 10, the top 32 includes an opening 36 that is open to the melting chamber 26. The opening 36 provides an inlet for loading the filler material 12 and/or other substances (e.g., a gas, applying a vacuum, and/or the like) into the melting chamber 26. Although only one is shown, the crucible 22 may include any number of openings 36 in the top 32. Moreover, in addition or alternative to extending through the top 32, the crucible 22 may include one or more openings (not shown) that extend through any side(s) 38 of the crucible 22 for providing an inlet for loading the filler material 12 and/or other substances into the melting chamber 26.

The crucible 22 includes an outlet system 40 that is fluidly connected to the melting chamber 26. The outlet system 40 may include any structure, configuration, means, arrangement, and/or the like that facilitates the delivery of molten filler material 12 from the melting chamber 26 to the target site 18 of the substrate material 14. In some embodiments, the outlet system 40 is configured to deliver molten filler material 12 from the melting chamber 26 to the target site 18 of the substrate material 14 in a continuous molten stream. The outlet system 40 and/or one or more components thereof (e.g., the opening 42 and the nozzle 46 described below) may be referred to herein as an "outlet" of the melting chamber 26.

In some embodiments, the outlet system 40 is configured to deliver molten filler material 12 to the target site 18 of the substrate material 14 at a flow rate of at least approximately 2 meters per second (m/s), for example under a pressure of between approximately 4 pounds per square inch (psi) and approximately 16 psi. Moreover, in some embodiments, the outlet system 40 is configured to deliver to the target site 18 of the substrate material 14 a continuous molten stream of filler material 12 that is at least approximately 10 centimeters (cm) long, at least approximately 20 cm long, and/or the like, for example under a pressure of between approximately 4 psi and approximately 16 psi. At a flow rate of approximately 3 m/s, the temperature loss of an approximately 20 cm long continuous molten stream of filler material 12 may be less than approximately 10° C.

The outlet system 40 includes one or more openings 42 that are open to the melting chamber 26. The opening 42 provides an outlet for releasing molten filler material 12 from the melting chamber 26 of the crucible. In the exemplary embodiment of the system 10, the opening 42 extends through the bottom 34 of the crucible 22. But, in addition or alternative to extending through the bottom 34, the outlet system 40 may include one or more openings 42 that extend through any side(s) 38 and/or the top 32 of the crucible 22. Although only a single opening 42 is shown, the outlet system 40 may include any number of the openings 42.

The outlet system 40 may include a nozzle 46. The nozzle 46 is fluidly connected to the opening 42 for applying the filler material 12 to the target site 18 of the substrate material 14, as will be described in more detail below.

Figure 2:
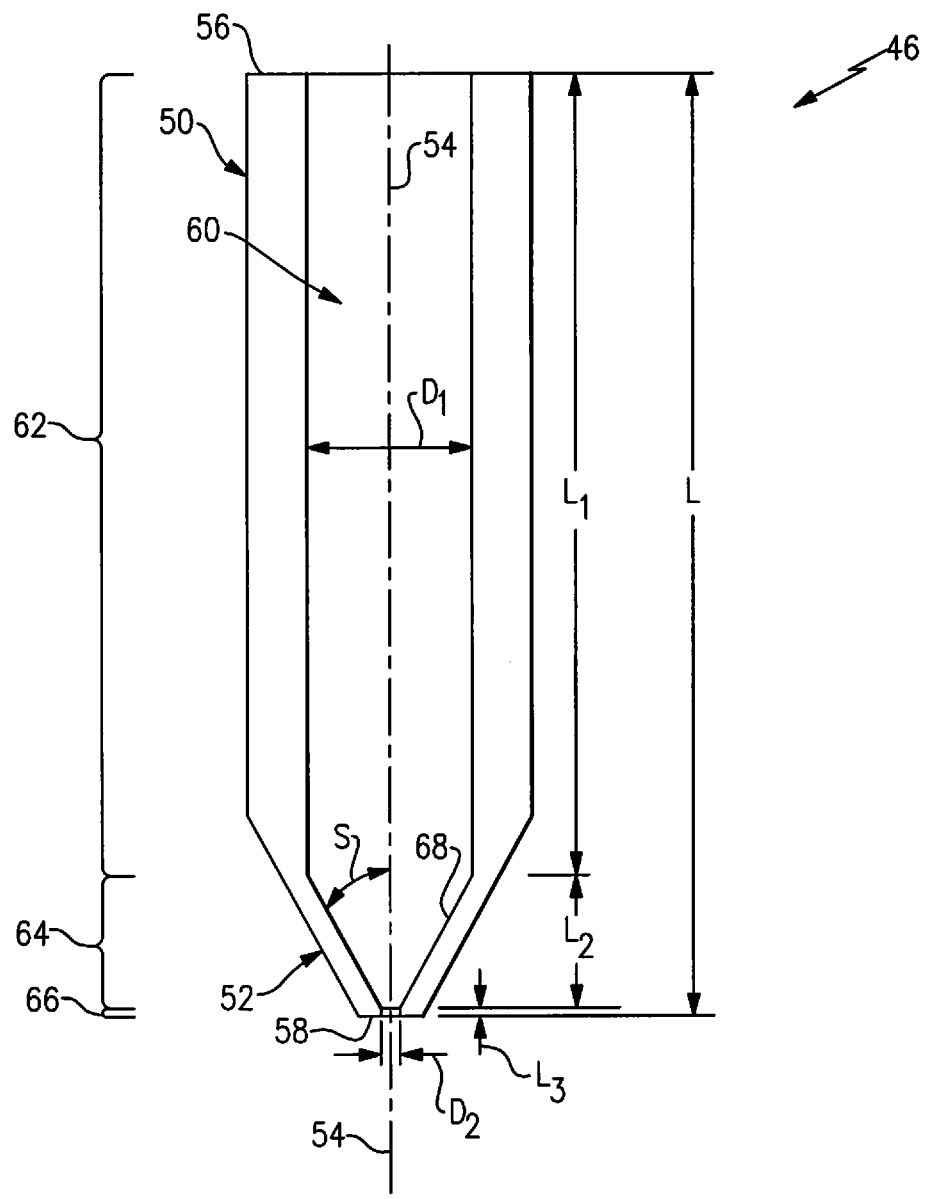
FIG. 2 is a cross sectional view of an exemplary embodiment of a nozzle of the system shown in FIG. 1.

FIG. 2 is a cross sectional view of an exemplary embodiment of the nozzle 46. The nozzle 46 includes a base 50 and a tip 52. The nozzle 46 extends a length L along a central longitudinal axis 54 from an end surface 56 of the base 50 to a tip surface 58 of the tip 52. The nozzle 46 may have any length L. In some embodiments, the length L of the nozzle 46 is selected to facilitate delivering molten filler material 12 (shown in FIGS. 1 and 3) in a continuous molten stream, to facilitate preventing the loss of heat from the molten filler material 12, and/or to facilitate prevent contamination to the molten filler material 12 (e.g., from contact with the nozzle 46 and/or the atmosphere). Examples of the length L of the nozzle 46 include, but are not limited to, between approximately 50 mm and approximately 250 mm, greater than approximately 50 mm, greater than approximately 149 mm, and/or the like.

The nozzle 46 includes an opening 60 that extends through the length L of the nozzle 46, as can be seen in FIG. 2. The opening 60 includes an entrance segment 62, a tapered segment 64, and an outlet segment 66. The entrance segment 62 extends through the end surface 56 and along the base 50. The outlet segment 66 extends through the tip surface 58. The tapered segment 64 extends between, and fluidly interconnects, the entrance segment 62 and the outlet segment 66.

The entrance segment 62 of the opening 60 extends a length $L_1$. In the exemplary embodiment of the system 10, the entrance segment 62 is directly fluidly connected to the opening 42 (shown in FIGS. 1 and 3) of the crucible 22 (shown in FIGS. 1 and 3) for receiving molten filler material 12 therefrom. The entrance segment 62 may have any length $L_1$. In some embodiments, the length $L_1$ of the entrance segment 62 is selected to facilitate delivering molten filler material 12 in a continuous molten stream, to facilitate preventing the loss of heat from the molten filler material 12, and/or to facilitate prevent contamination to the molten filler material 12. Examples of the length $L_1$ of the entrance segment 62 include, but are not limited to, between approximately 30 mm and approximately 230 mm, greater than approximately 30 mm, greater than approximately 129 mm, and/or the like.

The entrance segment 62 includes a diameter $D_1$. In the exemplary embodiment of the system 10, the diameter $D_1$ of the entrance segment 62 is approximately constant along the length of the entrance segment 62. But, alternatively, the diameter $D_1$ of the entrance segment 62 is variable along the length thereof. The entrance segment 62 may have any diameter $D_1$. The diameter $D_1$ of the entrance segment 62 may or may not be the same or similar to the diameter of the opening 42. In some embodiments, the diameter $D_1$ of the entrance segment 62 and/or the relation of the diameter $D_1$ to the diameter of the opening 42 is selected to facilitate delivering molten filler material 12 in a continuous molten stream, to facilitate preventing the loss of heat from the molten filler material 12, and/or to facilitate prevent contamination to the molten filler material 12. Examples of the diameter $D_1$ of the entrance segment 62 include, but are not limited to, between approximately 10 mm and approximately 30 mm, greater than approximately 10 mm, greater than approximately 19 mm, and/or the like.

The tapered segment 64 of the opening 60 extends a length $L_2$, which may be any length $L_2$. In some embodiments, the length $L_2$ of the tapered segment 64 is selected to facilitate delivering molten filler material 12 in a continuous molten stream, to facilitate preventing the loss of heat from the molten filler material 12, and/or to facilitate prevent contamination to the molten filler material 12. Examples of the length $L_2$ of the tapered segment 64 include, but are not limited to, between approximately 9 mm and approximately 29 mm, greater than approximately 9 mm, greater than approximately 28 mm, and/or the like.

The tapered segment 64 tapers radially inward (relative to the central longitudinal axis 54) as the tapered segment 64 extends from the entrance segment 62 to the outlet segment 66. In other words, the tapered segment 64 narrows the width of the opening 60. The taper of the tapered segment 64 is defined by a sloped interior wall 68 of the nozzle 46. Specifically, the interior wall 68 has a slope S that extends radially inward as the tapered segment 64 extends to the outlet segment 66. The interior wall 68 may have any slope S that gives the tapered segment 64 any amount of taper. In some embodiments, the amount of taper of the tapered segment 64 is selected to facilitate delivering molten filler material 12 in a continuous molten stream, to facilitate preventing the loss of heat from the molten filler material 12, and/or to facilitate prevent contamination to the molten filler material 12. Examples of the slope S of the interior wall 68 include, but are not limited to, between approximately 20° and approximately 40°, greater than approximately 20°, greater than approximately 39°, and/or the like. In the exemplary embodiment of the system 10, the slope S of the interior wall 68 is approximately constant along the length of the tapered segment 64. But, alternatively, the slope S of the tapered segment 64 is variable along the length thereof.

The outlet segment 66 of the nozzle 46 is used to apply the filler material 12 to the target site 18 of the substrate material 14. For example, the outlet segment 66 provides an outlet where the molten filler material 12 exits the outlet system 40 for application to the substrate material 14. In some embodiments, the outlet segment 66 is configured such that the nozzle 46 is configured to deliver molten filler material 12 to the substrate material 14 in a continuous molten stream. The outlet segment 66 may be referred to herein as an "outlet opening".

The outlet segment 66 of the opening 60 includes a diameter $D_2$. The outlet segment 66 may have any diameter $D_2$. The outlet segment 66 extends a length $L_3$, which may be any length $L_3$. In some embodiments, the length $L_3$ of the outlet segment 66 is selected to facilitate delivering molten filler material 12 in a continuous molten stream, to facilitate preventing the loss of heat from the molten filler material 12, and/or to facilitate prevent contamination to the molten filler material 12. Examples of the length $L_3$ of the outlet segment 66 include, but are not limited to, between approximately 0.5 mm and approximately 2 mm, greater than approximately 0.5 mm, greater than approximately 1.9 mm, and/or the like. In some embodiments, the length $L_3$ of the outlet segment 66 is selected to provide a flow rate of molten filler material 12 through the outlet system 40 of at least approximately 2 m/s, for example under a pressure of between approximately 4 psi and approximately 16 psi. Moreover, in some embodiments, the length $L_3$ of the outlet segment 66 is selected to deliver a continuous molten stream of filler material 12 that is at least approximately 10 centimeters (cm) long, at least approximately 20 cm long, and/or the like, for example under a pressure of between approximately 4 psi and approximately 16 psi.

The nozzle 46 may include any substance(s) that enables the nozzle 46 to function as described and/or illustrated herein. The nozzle 46 may be fabricated from the same or similar substances as the crucible 22 or may be fabricated from alternative or additional substances from the crucible 22. Examples of suitable substances of the nozzle 46 include, but are not limited to, oxides, carbides, nitrides, alumina-based ceramics, alumina, porous alumina, boron nitride, quartz, ceramics, refractory ceramics, metallic cold hearths, a substance that is susceptible to induction heating, and/or the like. The nozzle 46 may be integrally formed with the crucible 22 (e.g., from the same substance(s) of the crucible 22) or may be formed as a discrete component from the crucible 22 that is thereafter attached to the crucible 22.

The nozzle 46 shown in FIG. 2 is intended as exemplary only. In other words, the outlet system 40 is not limited to the specific embodiment of the nozzle 46 that is shown and described herein. Rather, in addition or alternative to the nozzle 46, the outlet system 40 may include other nozzles (not shown) having other shapes, sizes, components, configurations, arrangement, and/or the like.

Referring again to FIG. 1, as briefly described above, the system 10 includes the flow control mechanism 70. The flow control mechanism 70 is operatively connected to the crucible 22 for controlling the flow of molten filler material 12 through the outlet system 40. For example, the flow control mechanism 70 is configured to apply a pressure differential $\Delta P_1$ across the outlet system 40 (e.g., across the opening 60 of the nozzle 46 at the outlet segment 66) of the crucible 22 to hold molten filler material 12 within the melting chamber 26. Specifically, the flow control mechanism 70 is configured to prevent molten filler material 12 from exiting the outlet system 40 by applying the pressure differential $\Delta P_1$ across the outlet system 40 of the crucible 22. Moreover, the flow control mechanism 70 is configured to release molten filler material 12 from the melting chamber 26 of the crucible 22 by applying a different pressure differential $\Delta P_2$ across the outlet system 40 of the crucible 22 that ejects molten filler material 12 from the melting chamber 26 of the crucible 22 through the outlet system 40. The pressure differential $\Delta P_1$ used to hold molten filler material 12 within the melting chamber 26 may be referred to herein as a "first pressure differential", while the pressure differential $\Delta P_2$ used to release molten filler material 12 from the melting chamber 26 may be referred to herein as a "second pressure differential". As will be described below, the pressure differentials $\Delta P_1$ and $\Delta P_2$ have different values. Moreover, in addition or alternative to using the pressure differentials $\Delta P_1$ and $\Delta P_2$ to control the flow of molten filler material 12 through the outlet system 44, the flow control mechanism 70 may use electromagnetic levitation to control the flow of molten filler material 12 through the outlet system 40, for example as is described in U.S. patent application Ser. No. 13/630,874, filed on Sep. 28, 2012.

As used herein, "holding" filler material 12 within the melting chamber 26 is intended to mean holding filler material 12 with a sufficient force such that the filler material 12 is prevented from exiting the outlet system 40. For example, "holding" filer material 12 may include exerting a holding force on filler material 12 that acts in a direction (e.g., the direction of the arrow A in FIG. 1) that is opposite gravity, wherein the holding force is greater than the gravitational forces acting on the filler material 12 (e.g., in the direction of the arrow B in FIG. 1) such that the filler material 12 is prevented from being pulled through the outlet system 40 by the gravitational forces. In other words, and for example, the pressure differential applied across the outlet system 40 to "hold" filler material 12 within the melting chamber 26 may exert a holding force that acts on filler material 12 in a direction (e.g., the direction A) that is opposite a head pressure of the filler material 12 at the outlet system 40.

"Holding" filler material 12 within the melting chamber 26 may or may not include lifting the filler material 12 away from an interior wall 72 of the melting chamber 26. In some embodiments, the outlet system and/or one or more components thereof (e.g., the opening 42 and the nozzle 46) are considered part of the melting chamber 26. Accordingly, "holding" filler material 12 within the melting chamber 26 may include preventing any filler material 12 that is already in the outlet system 40 from exiting the outlet system 40 or from traveling further downstream within the outlet system 40. But, in some embodiments, "holding" filler material 12 within the melting chamber 26 includes preventing filler material 12 from flowing into the outlet system 40 such that no filler material 12 is within the outlet system 40 during the "holding". Moreover, in other embodiments, "holding" filler material 12 within the melting chamber 26 includes drawing filler material 12 that is already within the outlet system 40 at least partially upstream within the outlet system 40 (e.g., such that no filler material 12 is within the outlet system 40). In other words, "holding" filler material 12 within the melting chamber 26 may or may not include separating filler material 12 from a segment or all of the outlet system 40 (e.g., the opening 42 and the segments 66, 64, and 62 of the nozzle 46). For example, in some embodiments, the holding force exerted on the filler material 12 is not sufficient to separate filler material 12 from any segment of the outlet system 40.

The flow control mechanism 70 may include any component that is capable of holding filler material 12 within the melting chamber 26 of the crucible 22 as is described and/or illustrated herein. In the exemplary embodiment of the system 10, the flow control mechanism 70 includes an inlet system 72 that is operatively connected to sources 74 and 76 of non-oxidizing gas 84 and 86, respectively. The inlet system 72 is configured to inject non-oxidizing gas from each of the sources 74 and 76 into, the melting chamber 26. Specifically, and as will be described below in more detail, the inlet system 72 is configured to inject non-oxidizing gas 84 into the melting chamber 26 from the source 74 at a pressure that is below environmental pressure to hold molten filler material 12 within the melting chamber 26, and the inlet system 72 is configured to inject non-oxidizing gas 86 into the melting chamber 26 from the source 76 at a pressure that is greater than environmental pressure to release molten filler material 12 from the melting chamber 26.

The non-oxidizing gas 84 of the source 74 may be any type of non-oxidizing gas, such as, but not limited to, an inert gas (e.g., argon) and/or the like. Moreover, the non-oxidizing gas 86 of the source 76 may be any type of non-oxidizing gas, such as, but not limited to, an inert gas (e.g., argon) and/or the like. The non-oxidizing gas 84 of the source 74 may or may not be the same as the non-oxidizing gas 86 of the source 76. The non-oxidizing gas 84 of the source 74 has a lower pressure $P_1$ than the pressure $P_2$ of the non-oxidizing gas 86 of the source 76. The inlet system 72 may include various flow and/or atmospheric control features (not shown), such as, but not limited to, valves, restrictors, blowouts, pumps, vacuum pumps, sensors, control units, processors, manual shutoffs, automatic shutoffs, hoses, conduits, piping, tubing, insulation, and/or the like. For example, in the exemplary embodiment of the system 10, the inlet system 72 includes one or more valves 78 that are fluidly connected between the melting chamber 26 and the non-oxidizing gas sources 74 and 76. The inlet system 72 also includes one or more switches 80 that control operation of the valve(s) 78 for switching between the non-oxidizing gas sources 74 and 76. Specifically, the switch 80 controls whether the valve 78 fluidly communicates the melting chamber 26 with the lower pressure non-oxidizing gas 84 of the source 74 or with the higher pressure non-oxidizing gas 86 of the source 76. Each valve 78 may be may be any type of valve, such as, but not limited to, a two-port valve, a three-port valve, a four-port valve, an L-ball valve, and/or the like. Each switch 80 may be any type of switch, such as, but not limited to, a relatively high speed digital switch. For example, a relatively high speed pressure switch with an approximately 0.0025 second response time may be used to control a transition from the source 74 to the source 76 within approximately 0.01 second. Although only one is shown, the inlet system 72 may include any number of valves 78, any number of switches 80, and/or any number of other components for switching between the sources 74 and 76. The non-oxidizing gas 84 of the source 74 may be referred to herein as a "first non-oxidizing gas", while the non-oxidizing gas 86 of the source 76 may be referred to as a "second non-oxidizing gas".

In addition to the inlet system 72, the flow control mechanism 70 may include one or more gates (not shown), one or more plugs (not shown), one or more valves (not shown), and/or one or more other flow control device that prevent filler material 12 from exiting the melting chamber 26 through the outlet system 40. For example, in some embodiments, a gate, plug, valve, and/or other flow control device is positioned within the opening 42 and/or at another location of the outlet system 40. The gate, plug, valve, and/or other flow control device may transition between a closed position wherein the gate, plug, valve, and/or other flow control device blocks filler material 12 from exiting the outlet system 40 and an open position wherein the gate, plug, valve, and/or other flow control device does not block filler material 12 from exiting the outlet system 40. In some embodiments, the opening 42 is sized such that an overpressure of filler material 12 is required before molten filler material 12 can pass through the opening 42. In such embodiments, filler material 12 may be exhausted from the melting chamber 26 in intervals.

The system 10 may include one or more controllers 82 and/or other sub-systems for controlling operation of the system 10. For example, the controller 82 may control operation of the heating element 20, the flow control mechanism 70, the inlet system 72, the switch 80, the valve 78, any sensors of the system 10, any gates, plugs, valves, switches, and/or other flow control devices of the system 10, and/or the like. Examples of the operations of the various components of the system 10 that may be controlled by the controller 82 include, but are not limited to, initiation of the heating element 20, the amount of heat imparted to the filler material 12 by the heating element 20, application of pressure differentials across the outlet system 40, the amount of holding force exerted on the filler material 12 by a pressure differential, initiation of energization of the induction coil of the heating element 20, the specific energization scheme of the induction coil of the heating element 20, initiation of injection of non-oxidizing gas into the melting chamber 26, the type, amount, and/or pressure of non-oxidizing gas injected into the melting chamber 26, and/or the like.

Other exemplary operations of the controller 82 include, but are not limited to, monitoring one or more sensors of the system 10 that determine the amount and/or rate of heat being imparted to the filler material 12, monitoring one or more sensors of the system 10 that determine the temperature of the filler material 12 and/or whether the filler material 12 has reached the liquidus temperature of the filler material 12, monitoring one or more sensors of the system 10 that determine the amount of pressure within the melting chamber 26, monitoring one or more sensors of the system 10 that determine the amount of pressure differential across the outlet system 40, monitoring one or more sensors of the system 10 that determine the amount of holding force being applied to the filler material 12, monitoring one or more sensors of the system 10 that determine a flow rate of molten filler material 12 through the outlet system 40, and/or the like.

Figure 3:
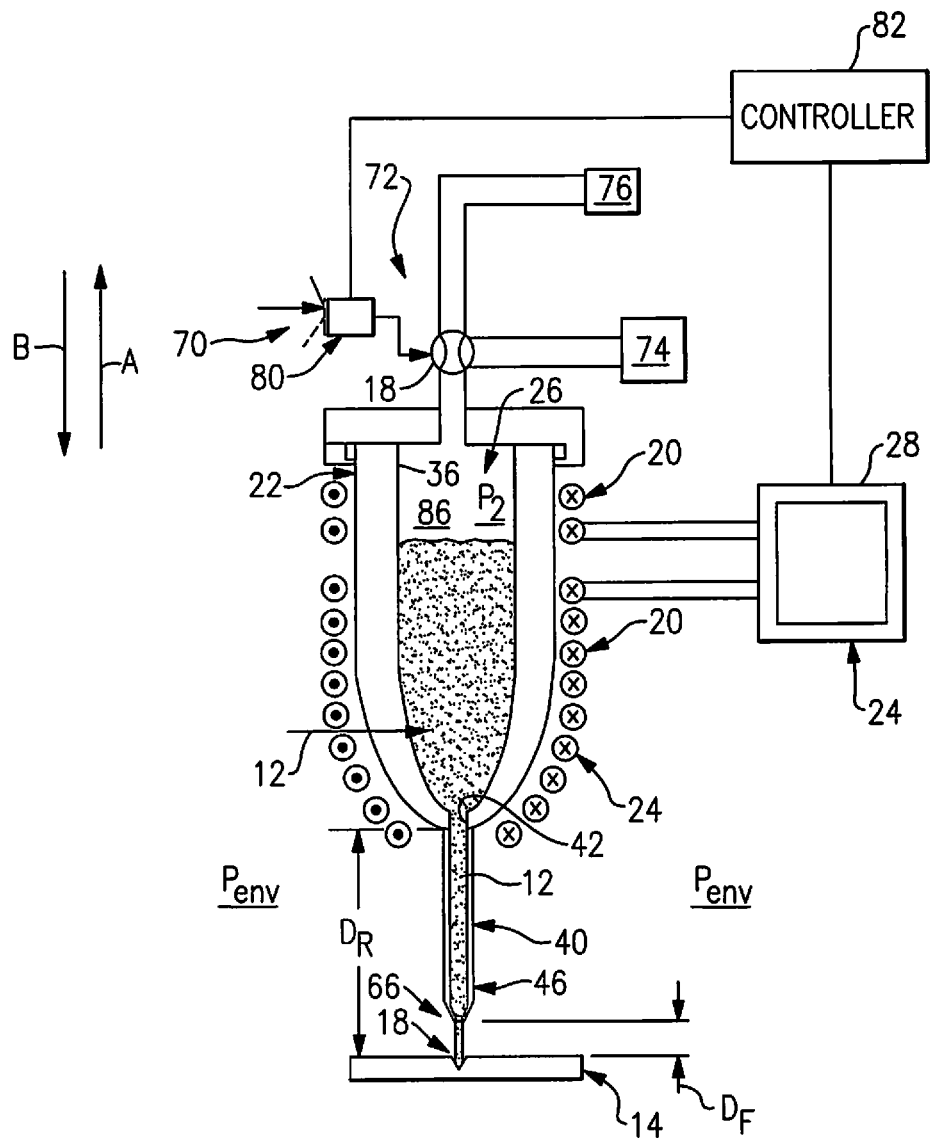
FIG. 3 is another schematic illustration of the system shown in FIG. 1.

In operation, and referring now to FIGS. 1 and 3, filler material 12 is loaded into the melting chamber 26 of the crucible 22, for example through the opening 36. As described above, the filler material 12 may be in any state and may have any structure, form, configuration, size, shape, quantity, and/or the like when the filler material 12 is loaded into the melting chamber 26. The induction coil of the heating element 20 is energized using the power source 28 to thereby heat the filler material 12 within the melting chamber 26. Once a sufficient amount of heat is imparted to the filler material 12, the filler material 12 melts and is thereby transformed into a molten state. Both FIGS. 1 and 3 illustrate the filler material 12 as molten.

In some embodiments, melting the filler material 12 includes superheating the filler material 12 to a temperature exceeding the liquidus temperature of the filler material 12, for example to facilitate ensuring that molten filler material 12 flows throughout and completely fills the target site 18 (not shown in FIG. 1) of the substrate material 14 (not shown in FIG. 1) prior to cooling and solidifying. The induction coil of the heating element 20 may be configured to maintain the filler material 12 within the melting chamber 26 as molten and/or within a predetermined temperature range, for example for a predetermined amount of time before molten filler material 12 is applied to the substrate material 14. In some embodiments, the system 10 is configured to heat a super alloy filler material 12 from room temperature to approximately 1550° C. within approximately 15 minutes, and allow a dwell time of equal to or greater than approximately 30 minutes without thermal shock, mechanical failures, melt contaminations, and/or the like.

As described above, melting the filler material 12 may be performed at a remote distance $D_R$ (not shown in FIG. 1) from the target site 18 of the substrate material 14. The remote distance $D_R$ includes any distance between the target site 18 and the system 10 (e.g., the heating element 20, the crucible 22, and any molten filler material 12 in the crucible 22) that is large enough that the target site 18 does not rise above the solidus and/or recrystallization temperature of the target site 18 as a result of the radiant energy from the system 10. The remote distance $D_R$ may have a dimension such that melting of the filler material 12 is performed within the same facility or within a different facility as the location of the target site 18 of the substrate material 14. The remote distance $D_R$ may depend, for example, on the amount of energy applied to the filler material 12 from the heating element 20, the amount of time energy is applied to the filler material 12, the particular substance(s) that compose the target site 18 of the substrate material 14, the amount of energy radiating from the heating element 20, the amount and/or temperature of any molten filler material 12 contained within the melting chamber 26, and/or any insulating barriers between the system 10 and the target site 18. In some embodiments, some radiant energy from the system 10 may heat the target site 18 to a temperature below the solidus and/or recrystallization temperature of the target site 18. In such embodiments, such heating may be taken into account when potentially preheating the target site 18 as discussed below. The ability of the filler material 12 to be melted at a remote distance $D_R$ from the target site 18 is also described in U.S. 2013/0277416 A1.

Before being delivered to the target site 18 of the substrate material 14, the filler material 12 is held within the melting chamber 26 by applying a pressure differential $\Delta P_1$ across the outlet system 40, as was briefly described above. Specifically, the switch 80 and the valve 78 are actuated to inject non-oxidizing gas 84 from the source 74 into the melting chamber 26, such that the melting chamber 26 is pressurized with the pressure $P_1$ of the non-oxidizing gas 84. FIG. 1 illustrates the melting chamber 26 pressurized with the non-oxidizing gas 84.

The pressure $P_1$ of the non-oxidizing gas 84 is lower than environmental pressure $P_{env}$. The environmental pressure $P_{env}$ is the pressure of the environment of the location of the substrate material 14 and the nozzle 46. The environmental pressure $P_{env}$ may be any pressure, such as, but not limited to, one atmospheric pressure, between approximately one and approximately two atmospheres, and/or the like. Because the pressure $P_1$ of the non-oxidizing gas 84 from the source 74 is lower than the environmental pressure $P_{env}$, the gas pressure within the melting chamber 26 is lower than the environmental pressure $P_{env}$. Pressurization of the melting chamber 26 with the non-oxidizing gas 84 thereby provides a pressure differential $\Delta P_1$ across the outlet system 40, which can be given by the equation $P_1 - P_{env}$. When calculated using the equation $P_1 - P_{env}$, the pressure differential $\Delta P_1$ has a negative value and is the gage pressure of the non-oxidizing gas 84. In the exemplary embodiment wherein the system 10 includes the nozzle 46, the pressure differential $\Delta P_1$ is across the outlet segment 66 of the nozzle 46.

The pressure differential $\Delta P_1$ exerts a holding force on the filler material 12 that holds the filler material 12 within the melting chamber 26. In other words, the pressure differential $\Delta P_1$ prevents filler material 12 from exiting the outlet system 40. In the exemplary embodiment of the system 10, the holding force exerted on the filler material 12 by the pressure differential $\Delta P_1$ acts in the direction A. As shown in FIG. 1, the pressure differential $\Delta P_1$ holds the filler material 12 at the outlet segment 66 of the nozzle 46 such that filler material 12 generally fills the outlet system 40 and is prevented from exiting the nozzle 46. But, in other embodiments, circumstances, situations, process steps, and/or the like, the pressure differential $\Delta P_1$ may hold the filler material 12 at the opening 42 or another segment of the outlet system 40 such that filler material 12 fills only a portion of the outlet system 40 or such that no filler material 12 is within the outlet system 40. In still other embodiments, circumstances, situations, process steps, and/or the like, the pressure differential $\Delta P_1$ may draw filler material 12 that is already within the outlet system 40 at least partially upstream within the outlet system 40.

Depending on the orientation of the crucible 22 and/or the outlet system 40 (i.e., an at least partially vertical orientation), the holding force provided by the pressure differential $\Delta P_1$ may need to overcome a head pressure of the filler material 12 that is caused by gravitational forces acting on the filler material 12. In other words, in some orientations of the crucible 22 and/or the outlet system 40, the holding force provided by the pressure differential $\Delta P_1$ may need to have a value that is equal to, or greater than, the value of the head pressure of the filler material 12 to be capable of holding the filler material 12 within the melting chamber 26. Accordingly, in embodiments wherein a head pressure is exerted on the filler material 12, the specific value of the pressure differential $\Delta P_1$ will depend on the value of the head pressure. In other embodiments wherein no head pressure is exerted on the filler material 12 because of the orientation of the crucible 22 and/or the outlet system 40 (e.g., an approximately horizontal orientation), the pressure differential may only need to be greater (when calculated to have a positive value) or less (when calculated to have a negative value) than zero to provide a holding force that is capable of holding the filler material 12 within the melting chamber 26.

In the exemplary embodiment of the system 10, the crucible 22 and the outlet system 40 are oriented such that the filler material 12 has a head pressure at the outlet segment 66 of the nozzle 46 that acts in the direction B. The pressure differential $\Delta P_1$ exerts the holding force that acts in the direction A, which is opposite the direction B. The holding force exerted on the filler material 12 by the pressure differential $\Delta P_1$ has an absolute value that is equal to, or greater than, the absolute value of the head pressure. When the pressure differential $\Delta P_1$ is calculated such that the pressure differential $\Delta P_1$ has a negative value, the value of the pressure differential $\Delta P_1$ is equal to, or less than, the value of the negative head pressure of the filler material 12. In other words, the negative gage pressure within the melting chamber 26 of the crucible 22 is equal to, or less than, the head pressure of the filler material 12.

The pressure $P_1$ of the non-oxidizing gas 84, the environmental pressure $P_{env}$, and the pressure differential $\Delta P_1$ may each have any value that provides a holding force having any value that is sufficient to hold the filler material 12 within the melting chamber 26. Examples of the value of the pressure differential $\Delta P_1$ when calculated using $P_1 - P_{env}$ include, but are not limited to, at least approximately −0.1 psi, between approximately −0.1 psi and −2.0 psi, at least approximately −2.0 psi, between approximately 1.0 psi and approximately 5.0 psi, at least approximately 5.0 psi, and/or the like. For example, for an environmental pressure $P_{env}$ of approximately 15.0 psi, the pressure $P_1$ of the gas may selected as approximately 13.0 psi, which gives a pressure differential $\Delta P_1$ of approximately −2.0 psi.

In some embodiments, holding of the filler material 12 using the pressure differential $\Delta P_1$ is initiated before heating of the filler material 12 is initiated, or holding of the filler material 12 using the pressure differential $\Delta P_1$ and heating of the filler material 12 are initiated simultaneously. In other embodiments, the filler material 12 is not held using the pressure differential $\Delta P_1$ until after heating of the filler material 12 has been initiated. In some embodiments, the pressure differential $\Delta P_1$ is applied as soon as the filler material 12 is loaded into the melting chamber 26.

In such embodiments wherein the filler material 12 is not held using the pressure differential $\Delta P_1$ until after heating of the filler material 12 has been initiated, holding using the pressure differential $\Delta P_1$ may be initiated as soon as any filler material 12 has transformed into a molten state to hold such molten filler material 12 within the melting chamber 26. For example, if a gate, plug, valve, and/or other flow control device is not provided within the outlet system 40, holding of the filler material 12 using the pressure differential $\Delta P_1$ may be initiated as soon as any filler material 12 has transformed into a molten state to hold such molten filler material 12 within the melting chamber 26. In embodiments wherein a gate, plug, valve, and/or other flow control device is provided within the outlet system 40, the gate, plug, valve, and/or other flow control device may be relied upon to hold any molten filler material 12 within the melting chamber 26 before the pressure differential $\Delta P_1$ is applied, or the pressure differential $\Delta P_1$ may be initiated as soon as any filler material 12 has transformed into a molten state to supplement the gate, plug, valve, and/or other flow control device. Moreover, when the filler material 12 is supplied to the melting chamber 26 in a size that is smaller than the opening 42 or that is smaller than the openings within a filter or screen (not shown) that is held within the opening 42, the pressure differential $\Delta P_1$ may be initiated as soon as the filler material 12 is loaded into the melting chamber 26 (in addition or alternative to using a gate, plug, valve, and/or other flow control device).

In some embodiments, the filler material 12 is not held using the pressure differential $\Delta P_1$ until after all of the filler material 12 has been transformed into a molten state. In such embodiments wherein the filler material 12 is not held using the pressure differential $\Delta P_1$ until after all of the filler material 12 has been transformed into a molten state, a gate, plug, valve, and/or other flow control device may be provided within the outlet system 40 to hold the molten filler material 12 within the melting chamber 26 before the pressure differential $\Delta P_1$ is applied.

In embodiments wherein the filler material 12 is held using the pressure differential $\Delta P_1$ during melting of the filler material 12, at least a portion of the filler material 12 is melted in a non-oxidizing environment, which may facilitate preventing charge contaminations (e.g., oxidation) of the filler material 12. In other words, the non-oxidizing gas 84 injected into the melting chamber 26 may facilitate preventing charge contaminations (e.g., oxidation) of the filler material 12 during melting thereof.

In some embodiments, the target site 18 of the substrate material 14 is pretreated before molten filler material 12 is delivered thereto. Pretreating the target site 18 of the substrate material 14 may be performed prior to, simultaneously with, or subsequent to (or combinations thereof) melting the filler material 12. Pretreating the target site 18 may include, but is not limited to, preheating the target site 18 to a preheat temperature that is above room temperature but is below the solidus and/or recrystallization temperature of the target site 18, cleaning (e.g., a surface of) the target site 18, excavating at least a portion of the substrate material 14 at the target site 18, and/or the like.

Cleaning the target site 18 of the substrate material 14 may allow for a relatively high quality bond between the substrate material 14 and the filler material 12. Cleaning the target site 18 may include, but is not limited to, cleaning the target site 18 of oxides, other non-metallic compounds, and/or the like. Cleaning the target site 18 may be performed using any method, means, cleaning agent, and/or the like, such as, but not limited to, by pickling, hydrogen cleaning, fluoride ion cleaning, and/or the like.

Excavating at least a portion of the substrate material 14 at the target site 18 may allow for the repair of a more geometric, consistent, and/or otherwise accessible target site 18. Moreover, excavation may provide a target site 18 having any geometric and/or non-geometric shape, for example to facilitate the subsequent addition of filler material 12. Excavation of at least a portion of the substrate material 14 at the target site 18 may be performed using any method, means, tool, and/or the like, such as, but not limited to, by grinding, cutting, shaving, drilling, sanding, and/or the like.

Preheating the target site 18 may, among other things, help prevent the premature cooling and/or solidification of molten filler material 12 as the molten filler material 12 is applied to the target site 18, reduce residual stress present at and/or around the target site 18, and/or the like. The preheating of the target site 18 may be accomplished by a variety of heating methods, such as, but not limited to, using an induction coil, a furnace, a laser and/or any other apparatus that is capable of providing energy and/or heat to the target site 18. In some embodiments, the same heating element 20 used to melt the filler material 12 within the crucible 22 is also used to preheat the target site 18 of the substrate material 14. For example, a common induction coil (not shown) may transition between the target site 18 and the crucible 22 so long as the target site 18 does not rise above, but is instead maintained below, the solidus and/or recrystallization temperature of the target site 18 prior to the delivery of molten filler material 12 thereto.

In some embodiments, the temperature of the target site 18 of the substrate material 14 is monitored (e.g., using the controller 82 and/or another control system) via one or more temperature sensors (not shown) such as, but not limited to, thermocouples, pyrometers, thermometers and/or the like. Feedback from the one or more temperature sensors may be utilized to control the amount of heat and/or energy applied to the target site 18 of the substrate material 14 such that the preheat temperature is controlled. For example, such feedback can be utilized to control the amount of power to the preheating device, the distance between the preheating device and the target site 18, and/or any other variable that may affect the temperature of the target site 18 of the substrate material 14.

Once it is desired to begin applying molten filler material 12 to the substrate material 14, the flow control mechanism 70 is used to release molten filler material 12 from the crucible 22 through the outlet system 40. For example, in some embodiments, molten filler material 12 is released from the melting chamber 26 of the crucible 22 by applying a pressure differential $\Delta P_2$ across the outlet system 40. Specifically, the switch 80 and the valve 78 are actuated to inject non-oxidizing gas 86 from the source 76 into the melting chamber 26, such that the melting chamber 26 is pressurized with the pressure $P_2$ of the non-oxidizing gas 86. FIG. 3 illustrates the melting chamber 26 pressurized with the non-oxidizing gas 86.

The pressure $P_2$ of the non-oxidizing gas 86 is higher than environmental pressure $P_{env}$. Because the pressure $P_2$ of the non-oxidizing gas 86 from the source 76 is higher than the environmental pressure $P_{env}$, the gas pressure within the melting chamber 26 is higher than the environmental pressure $P_{env}$. Pressurization of the melting chamber 26 with the non-oxidizing gas 86 thereby provides a pressure differential $\Delta P_2$ across the outlet system 40, which can be given by the equation $P_2 - P_{env}$. When calculated using the equation $P_2 - P_{env}$, the pressure differential $\Delta P_2$ has a positive value and is the gage pressure of the non-oxidizing gas 86. In the exemplary embodiment wherein the system 10 includes the nozzle 46, the pressure differential $\Delta P_2$ is across the outlet segment 66 of the nozzle 46.

The pressure differential $\Delta P_2$ exerts an ejection force on the filler material 12 that ejects the filler material 12 from the melting chamber 26. In other words, the pressure differential $\Delta P_2$ ejects the filler material 12 from the melting chamber 26 through the outlet system 40. Any gates, plugs, valves, or other flow control devices provided within the outlet system 40 may be removed and/or opened to enable the molten filler material 12 to exit the outlet system 40 when the pressure differential $\Delta P_2$ is applied. In some embodiments, the flow control mechanism 70 is configured to release molten filler material 12 from the melting chamber 26 in a continuous molten stream.

In the exemplary embodiment of the system 10, the ejection force exerted on the filler material 12 by the pressure differential $\Delta P_2$ acts in the direction B. Depending on the orientation of the crucible 22 and/or the outlet system 40 (i.e., an at least partially vertical orientation), the ejection force provided by the pressure differential $\Delta P_2$ may supplement gravitational forces acting on the filler material 12. In other words, the ejection force provided by the pressure differential $\Delta P_2$ may supplement a head pressure of the filler material 12. For example, in the exemplary embodiment of the system 10, the ejection force provided by the pressure differential $\Delta P_2$ acts in the same direction B as the head pressure at the outlet segment 66 of the nozzle 46.

The pressure $P_2$ of the non-oxidizing gas 86, the environmental pressure $P_{env}$, and the pressure differential $\Delta P_2$ may each have any value that provides an ejection force having any value for providing any flow rate of molten filler material 12 exiting the outlet system 40. In other words, the ejection force may be selected to deliver molten filler material 12 to the target site 18 of the substrate material 14 at any desired flow rate. The overall system response time for ejection of molten filler material 12 may be limited by the rate of rise of flow velocity during the transition to the steady state.

Examples of the value of the pressure differential $\Delta P_2$ when calculated using $P_2-P_{env}$ include, but are not limited to, at least approximately 1.0 psi, between approximately 1.0 psi and 10.0 psi, at least approximately 5.0 psi, between approximately 5.0 psi and approximately 15.0 psi, at least approximately 15.0 psi, and/or the like. For example, for an environmental pressure $P_{env}$ of approximately 15.0 psi, the pressure $P_2$ of the gas may selected as approximately 30.0 psi, which gives a pressure differential $\Delta P_2$ of approximately 15.0 psi.

FIG. 3 illustrates molten filler material 12 being delivered from the melting chamber 26 of the crucible 22 to the target site 18 of the substrate material 14 through the outlet system 40. Referring now solely to FIG. 3, the molten filler material 12 may exit the outlet system 40 (e.g., the nozzle 46) at any flow distance $D_F$ away from the target site 18 of the substrate material 14. The molten filler material 12 may be delivered and applied to the target site 18 of the substrate material 14 for any length of time, for example a length of time necessary to apply a desired and/or necessary amount of molten filler material 12 to the target site 18. For example, the duration of delivery and application of the molten filler material 12 to the target site 18 may depend on, but is not limited to depending on, the flow rate of the molten filler material 12, the size of the target site 18, and/or the like. The delivery and application of molten filler material 12 to the target site 18 may occur in the same or a substantially similar environment as the melting of the filler material 12. The amount of mass and heat input from each delivery of molten filler material 12 to one or more target sites 18 may be controlled by presetting a pressure dwell as needed, such as, but not limited to, from approximately 0.05 to approximately 1 second.

In some embodiments, delivering the molten filler material 12 to the target site 18 of the substrate material 14 causes a local portion of the substrate material 14 (i.e., a portion of the substrate material 14 that comes into contact with the molten filler material 12) at the target site 18 to temporarily melt. Specifically, the temperature of the molten filler material 12 temporarily raises the temperature of the local portion of the substrate material 14 above the melting temperature of the local portion of the substrate material such that the molten filler material 12 and the local portion of the substrate material 14 bond together as the filler material 12 and the local portion of the substrate material 14 cool. In such embodiments, the resulting joint of the filler material 12 bonded with the substrate material 14 may be larger than an original gap.

In some embodiments, the outlet system 40 is configured to deliver molten filler material 12 from the crucible 22 to the target site 18 of the substrate material 14 in a continuous molten stream (e.g., without forming distinct droplets or other interruptions between deliveries). For example, the flow distance $D_F$ and the flow rate of the molten filler material 12 may be coordinated such that the molten filler material 12 is delivered to the target site 18 in a continuous stream. Delivery of the molten filler material 12 in a continuous stream may refer to continuously applying the molten filler material 12 to the target site 18 without stoppage or breaks. By applying all of the molten filler material 12 to the target site 18 in a continuous stream (as opposed to in a plurality of application intervals with breaks between each application), the new material (i.e., the filler material 12) applied to the substrate material 14 may be capable of providing relatively strong mechanical properties post solidification. Moreover, depending on the particular filler material 12 used (e.g., René™ 142), the new material applied to the substrate material 14 may be capable of providing relatively stronger mechanical properties than what could be used if the filler material 12 was melted directly at the target site 18. Solidification of the molten filler material 12 may thereby occur through heat extraction into the cooler substrate material 14. In some embodiments, the system 10 is configured to deliver a continuous molten stream of filler material 12 that is greater than approximately 10 cm, greater than approximately 19 cm, approximately 20 cm, between approximately 10 cm and approximately 20 cm, and/or the like.

Once the desired amount of filler material 12 has been applied to the target site 18 of the substrate material 14, the delivery of molten filler material 12 to the target site 18 may be stopped by: re-applying the pressure differential $\Delta P_2$ to the filler material 12; by closing a gate, plug, valve, or other flow control device; by running out of molten filler material 12 within the crucible 22; and/or by moving the outlet system 40 away from the target site 18 of the substrate material 14. When it is desired to apply filler material 12 to another target site (not shown) of the substrate material 14 or to another substrate material (not shown, e.g., another component that is desired to be repaired using the filler material 12 and/or to otherwise have filler material 12 joined thereto), the pressure differential $\Delta P_2$ and/or the gate, plug, valve, or other flow control device may prevent filler material 12 from exiting (e.g., dribbling, flowing, and/or the like) the outlet system 40 as the outlet system 40 is moved to the other target site or the other substrate material. Once the outlet system 40 is positioned at the other target site or at the target site of the other substrate material, the flow control mechanism 70 can be actuated to release molten filler material 12 from the crucible 22 through the outlet system 40 as is described above.

Figure 4:
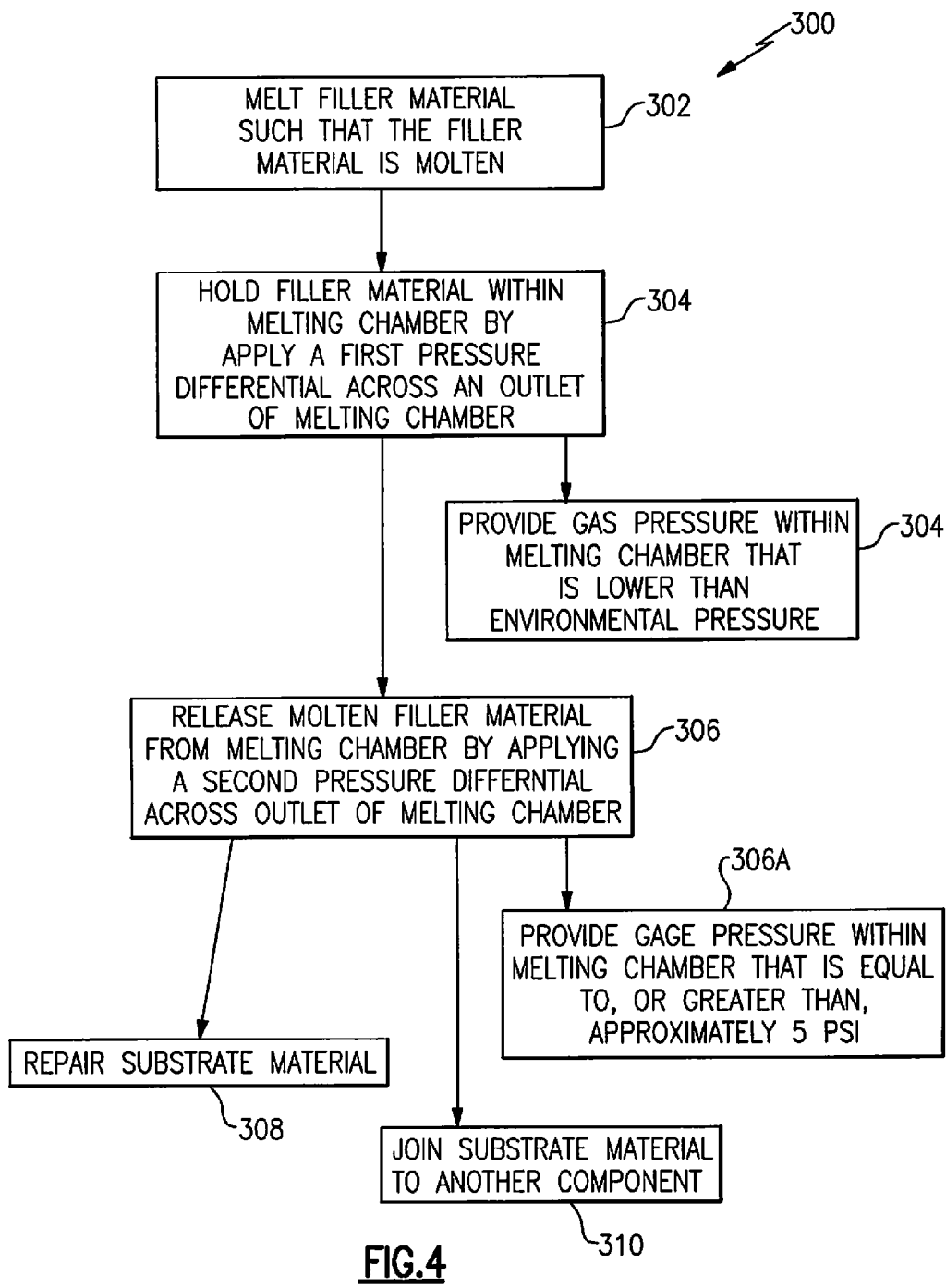
FIG. 4 is a flowchart illustrating an exemplary embodiment of a method for joining a filler material to a substrate material.

FIG. 4 is a flowchart illustrating an exemplary embodiment of a method 300 for joining a filler material (e.g., the filler material 12 shown in FIGS. 1 and 3) to a substrate material (e.g., the substrate material 14 shown in FIG. 3). The method 300 may be performed, for example, using the system 10 (FIGS. 1 and 3). At 302, the method 300 includes melting the filler material within a melting chamber (e.g., the melting chamber 26 shown in FIGS. 1 and 3) of a crucible (e.g., the crucible 22 shown in FIGS. 1 and 3) such that the filler material is completely molten. In some embodiments, melting the filler material at 302 includes melting the filler material using induction heating. Moreover, in some embodiments, the filler material is superheated by 200° C. or greater. Melting the filler material at 302 may include melting the filler material at a remote distance away from a target site of the substrate material such that melting at 302 the filler material maintains the target site of the substrate material below a solidus temperature and/or a recrystallization temperature of the target site. Moreover, melting the filler material at 302 may include applying a non-oxidizing gas to the melting chamber.

At 304, the method 300 includes holding the filler material within the melting chamber of the crucible by applying a first pressure differential (e.g., the pressure differential $\Delta P_1$) across the outlet (e.g., the outlet system 40 shown in FIGS. 1 and 3) of the crucible. Holding the filler material at 304 prevents the filler material from exiting the outlet of the crucible (using the first pressure differential). In some embodiments, holding the filler material within the melting chamber of the crucible using the first pressure differential includes providing, at 304a, a gas pressure within the melting chamber that is lower than an environmental pressure. Moreover, in some embodiments, holding the filler material within the melting chamber using the first pressure differential includes providing a negative gage pressure within the melting chamber that is equal to or less than (in absolute value) the head pressure of the filler material at the outlet of the crucible.

At 306, the method 300 includes releasing the molten filler material from the melting chamber of the crucible by applying a second pressure differential (e.g., the pressure differential $\Delta P_2$) across the outlet of the crucible to deliver the molten filler material to the target site of the substrate material. The second pressure differential has a different value and direction than the first pressure differential. Releasing the filler element at 306 by applying the second pressure differential includes ejects the filler material from the melting chamber through the outlet. Releasing the filler material from the melting chamber of the crucible includes providing a gas pressure within the melting chamber that is higher than an environmental pressure. In some embodiments, releasing the filler material from the melting chamber of the crucible includes providing, at 306a, a positive gage pressure within the melting chamber that is equal to, or greater than, approximately 5 psi. Moreover, in some embodiments, releasing the molten filler material at 306 includes delivering the filler material to the target site of the substrate material in a continuous molten stream, as is described above. Releasing the molten filler material at 306 may include supplementing gravitational forces acting on the filler material.

The method 300 may include repairing, at 308, the substrate material at the target site using the molten filler material, and/or joining, at 310, the substrate material to another component at the target site using the molten filler material.

Referring again to FIGS. 1 and 3, in some embodiments, the system 10 is: (1) thermal shock resistant to a rapid heating from room temperature to at least approximately 1550° C. within at least approximately 15 min; (2) capable of holding filler material 12 at at least approximately 1550° C. for at least approximately 30 min; (3) chemically inert when exposed to filler materials 12 at at least approximately 1550° C. for at least approximately 30 min; (4) capable of delivering a continuous molten stream of filler material 12 that is at least approximately 10 cm (e.g., up to approximately 20 cm) without breakup; (5) capable of delivering a stream of molten filler material 12 with less than approximately 50° C. temperature loss; (6) capable of delivering a stream of molten filler material 12 with less than approximately 10° C. temperature loss; (7) capable of delivering a continuous melt jet (i.e., a stream of molten filler material 12) having a length of between approximately 15 cm and approximately 25 cm and traveling under a pressure differential of between approximately 5 psi and approximately 15 psi with a temperature loss of less than approximately 10° C. and/or (8) capable of delivering streams of molten filler material 12 consecutively and/or consistently.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer", "controller", and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer".

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials and/or substances, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments described and/or illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments described and/or illustrated herein, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system for joining a filler material to a substrate material, the system comprising:
   a crucible having a melting chamber for holding the filler material, the crucible comprising an outlet system including a nozzle fluidly connected to the melting chamber, the nozzle having an entrance segment having a first length and fluidly connected to an opening in the crucible, a tapered segment following the entrance segment and having a second length and tapering radially inward relative to a central longitudinal axis of the crucible, and an outlet segment having a third length following the tapered segment;
   a heating element operatively connected to the crucible for heating the filler material within the melting chamber of the crucible, the heating element being configured to melt the filler material within the melting chamber such that the filler material is molten; and
   a flow control mechanism operatively connected to the crucible for controlling flow of the filler material through the outlet system of the melting chamber, the flow control mechanism being configured to apply a pressure differential across the outlet system of the crucible, wherein the pressure differential holds the filler material within the melting chamber.

2. The system of claim 1, wherein the flow control mechanism is configured to apply the pressure differential across the outlet system of the crucible by providing a gas pressure within the melting chamber of the crucible that is lower than an environmental pressure.

3. The system of claim 1, wherein the flow control mechanism is configured to apply the pressure differential across the outlet system of the crucible comprises by providing a negative gage pressure within the melting chamber of the crucible that is equal to or less than a head pressure of the filler material at the opening of the crucible.

4. The system of claim 1, wherein the pressure differential is a first pressure differential, the flow control mechanism being configured to release the filler material from the melting chamber of the crucible by applying a second pressure differential across the outlet system of the crucible, the second pressure differential being different than the first pressure differential.

5. The system of claim 4, wherein the flow control mechanism is configured to apply the second pressure differential across the outlet system of the crucible by providing a gas pressure within the melting chamber of the crucible that is higher than an environmental pressure.

6. The system of claim 4, wherein the flow control mechanism is configured to apply the second pressure differential across the outlet system of the crucible by providing a positive gage pressure within the melting chamber of the crucible that is equal to or greater than approximately 5 pounds per square inch (psi).

7. The system of claim 1, wherein the flow control mechanism is configured to release the filler material from the melting chamber of the crucible by supplementing gravitational forces acting on the filler material.

8. The system of claim 1, wherein the flow control mechanism comprises a valve that is operatively connected to a supply of non-oxidizing gas for applying the pressure differential to the melting chamber.

9. The system of claim 1, wherein the pressure differential is a first pressure differential, the how control mechanism comprising a valve that is operatively connected to a supply of a first non-oxidizing gas for applying the first pressure differential to the melting chamber, the valve being operatively connected to a supply of a second non-oxidizing gas for applying a second pressure differential to the melting, chamber to release the filler material from the melting chamber, wherein the first non-oxidizing, gas has a lower pressure than the second non-oxidizing gas, and wherein the first and second pressure differentials are different from each other.

10. The system of claim 9, wherein the valve comprises an L-ball valve.

11. The system of claim 1, wherein the nozzle is integrally forme with the crucible.

12. The system of claim 1, wherein the melting chamber of the crucible tapers radially inward toward the opening relative to the central longitudinal axis.

13. The system of claim 12, wherein a side of the crucible tapers radially inwardly relative to the central longitudinal axis at a portion of the crucible where the melting chamber tapers radially inwardly.

14. The system of claim 13, wherein the heating element is an induction coil wound around a circumference of the crucible, including the radially inwardly tapered side of the crucible.

15. The system of claim 14, wherein the first length of the entrance segment is between 30 mm and 230 mm; a diameter of the entrance segment is between 10 mm and 30 mm; the second length of the tapered segment is between 9 mm and 28 mm; an interior wall of the tapered segment has a slope between 20° and 40°; and the third length of the outlet segment is between 0.5 mm and 2 mm.

16. The system of claim 12, wherein the first length of the entrance segment is between 30 mm and 230 mm; a diameter of the entrance segment is between 10 mm and 30 mm; the second length of the tapered segment is between 9 mm and 28 mm; an interior wall of the tapered segment has a slope between 20° and 40°; and the third length of the outlet segment is between 0.5 mm and 2 mm.

17. The system of claim 1, wherein the first length of the entrance segment is between 30 mm and 230 mm.

18. The system of claim 17, wherein a diameter of the entrance segment is between 10 mm and 30 mm.

19. The system of claim 1, wherein the second length of the tapered segment is between 9 mm and 28 mm.

20. The system of claim 19, wherein an interior wall of the tapered segment has a slope between 20° and 40°.

21. The system of claim 1, wherein the third length of the outlet segment is between 0.5 mm and 2 mm.

22. A system for joining a filler material to a substrate material, the system comprising:
a crucible having a melting chamber for holding the filler material, the crucible comprising an outlet system including a nozzle fluidly connected to the melting chamber, the nozzle having an entrance segment having a first length and fluidly connected to an opening in the crucible, a tapered segment following the entrance segment and having a second length and tapering radially inward relative to a central longitudinal axis of the crucible, and an outlet segment having a third length following the tapered segment;
a heating element operatively connected to the crucible for heating the filler material within the melting chamber of the crucible, the heating element being configured to melt the filler material within the melting chamber such that the filler material is molten; and
a flow control mechanism operatively connected to the crucible for controlling flow of the filler material through the outlet system of the melting chamber, the flow control mechanism being configured to a ply a pressure differential across the outlet system of the crucible, wherein the pressure differential holds the filler material within the melting chamber and the first length of the entrance segment is between 30 mm and 230 mm; a diameter of the entrance segment is between 10 mm and 30 mm; the second length of the tapered segment is between 9 mm and 28 mm; an interior wall of the tapered segment has a slope between 20° and 40°; and the third length of the outlet segment is between 0.5 mm and 2 mm.

* * * * *